(12) United States Patent
Cotteverte et al.

(10) Patent No.: US 6,283,016 B1
(45) Date of Patent: Sep. 4, 2001

(54) UNWINDING MACHINE

(75) Inventors: Patrick Cotteverte, Illkirch Graffenstaden; Daniel Bernard, Urmatt, both of (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,905

(22) PCT Filed: May 3, 2000

(86) PCT No.: PCT/DE00/01366

§ 371 Date: Feb. 21, 2001

§ 102(e) Date: Feb. 21, 2001

(87) PCT Pub. No.: WO00/67586

PCT Pub. Date: Nov. 16, 2000

(30) Foreign Application Priority Data

May 5, 1999 (DE) .............................. 199 20 612

(51) Int. Cl.[7] .................. A23L 1/00; A23P 1/00; A23G 3/02; A23G 3/06; A23G 7/00

(52) U.S. Cl. ............... 99/450.2; 99/343; 99/450.1; 425/294; 425/297; 425/327

(58) Field of Search .................. 99/353–355, 494, 99/450.1, 450.2, 450.8; 83/349, 436.15, 864, 698.61, 677, 403; 241/242, 285.13; 156/501; 425/294, 297, 376.1, 367, 327, 301; 426/249, 250, 104, 144, 5

(56) References Cited

U.S. PATENT DOCUMENTS

| 1,479,569 | * | 1/1924 | Waida ................................... 425/294 |
| 3,245,360 | * | 4/1966 | Evanson et al. .................... 99/450.2 |
| 3,570,417 | * | 3/1971 | Herrmann et al. ....................... 426/5 |
| 4,061,282 | * | 12/1977 | Walker et al. .................... 241/285.3 |
| 5,435,050 | * | 7/1995 | Alt .................................... 241/285.3 |
| 5,657,934 | * | 8/1997 | Pirrung et al. ....................... 241/242 |

* cited by examiner

Primary Examiner—Timothy F. Simone
(74) Attorney, Agent, or Firm—Ronald E. Greigg; Edwin E. Geigg

(57) ABSTRACT

An unwinding machine (10) with forming cylinders (11, 12, 13) has bearing blocks (26, 27) in which the forming cylinders (11, 12, 13) are supported. The bearing blocks (26, 27) are disposed in recesses (32) of partition walls (25, 25a) of the unwinding machine (10) and are secured by means of clamping devices (35). Furthermore, the forming cylinders (11, 12, 13) are coupled to a common drive motor (15). The unwinding machine (10) according to the invention permits a simple exchanging of the forming cylinders (11, 12, 13).

4 Claims, 1 Drawing Sheet

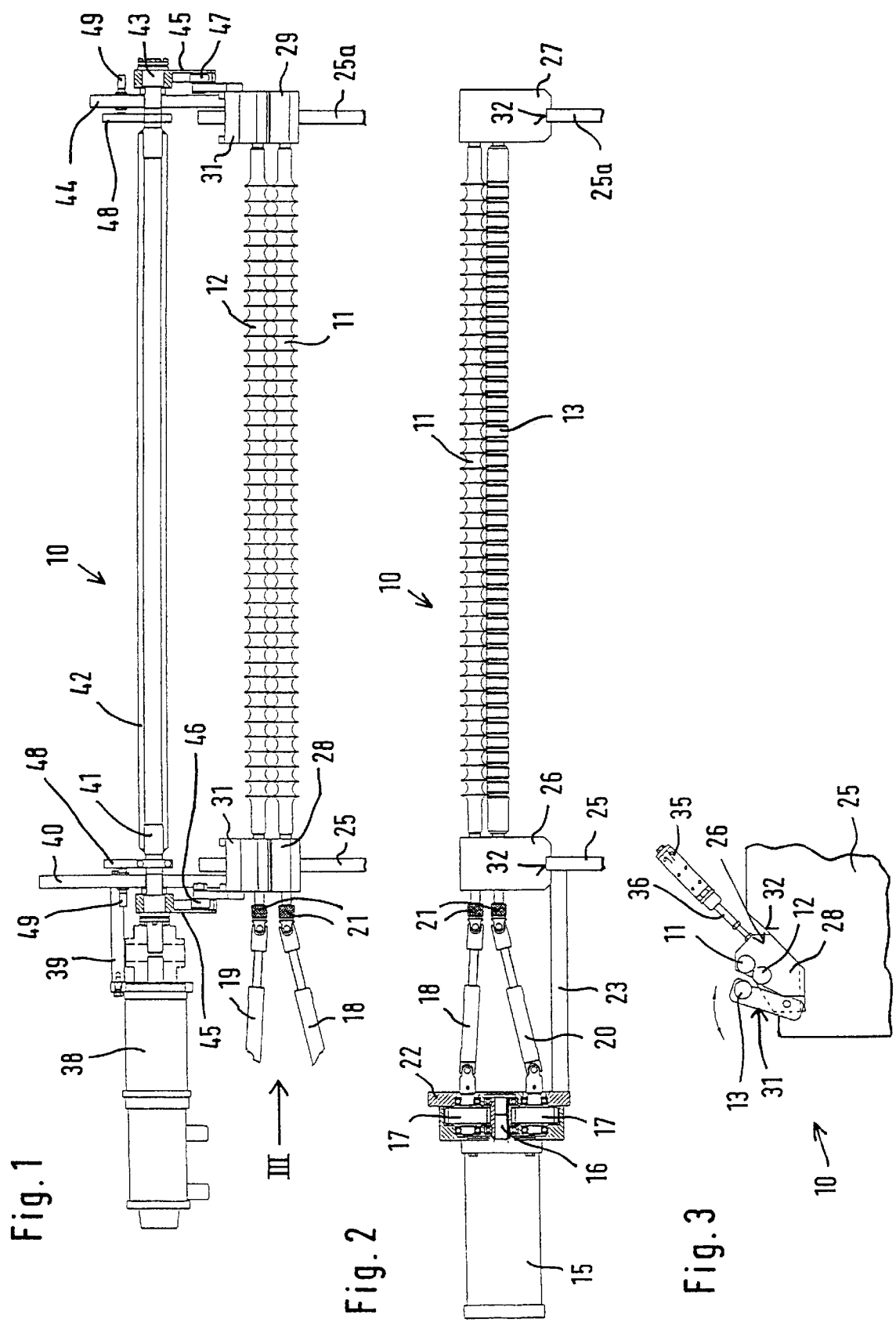

UNWINDING MACHINE

CROSS-REFERENCE TO RELATED APPLICATIONS

This application is a 35 USC 371 application of PCT/DE 00//01366 filed on May 3, 2000.

PRIOR ART

The invention relates to an unwinding machine. In a known unwinding machine, the forming cylinders are disposed in stationary bearings and are directly coupled to their drive mechanism. As a result, the axial distances between the forming cylinders are predetermined so that the unwinding machine is only suited for a particular format range. Therefore an adaptation to another format range, if it is even possible, can only be executed through costly retrofitting work.

ADVANTAGES OF THE INVENTION

The unwinding machine according to the invention, has the advantage over the prior art that it is suited to cover a very large format range without costly retrofitting work. This is permitted by means of bearing blocks exchangeably disposed on the machine, wherein the forming cylinders supported in the bearing blocks are coupled to their drive mechanism via articulating elements. It is therefore possible to couple bearing blocks with different distances between the individual forming cylinders in module fashion onto the unwinding machine.

Other advantageous improvements of the unwinding machine according to the invention are disclosed in the dependent claims. The exchanging and fastening of the bearing blocks in the unwinding machine can be achieved in a particularly simple and reliable manner if the bearing blocks are partially received in a form-fitting, positively engaging manner in corresponding recesses in the unwinding machine and can be secured by means of a clamping device.

BRIEF DESCRIPTION OF THE DRAWINGS

An exemplary embodiment of the invention is shown in the drawings and will be explained in detail below.

FIG. 1 is a simplified top view of a part of an unwinding machine according to the invention, FIG. 2 is a side view of the unwinding machine according to FIG. 1, and FIG. 3 is a side view in the direction III of FIG. 1.

DESCRIPTION OF THE EXEMPLARY EMBODIMENT

The unwinding machine 10 shown in the Figs. is used in the formation of small-sized, rotationally symmetrical products from an extruded strand segment. An unwinding machine 10 of this type is used in the candy industry for the production of different filled or unfilled pieces such as bubble gum, chews, or caramels. In order to form the products, the unwinding machine 10 has three forming cylinders 11, 12, 13 aligned parallel to one another, wherein the first two forming cylinders 11, 12 have a fixed axial distance from each other while the third forming cylinder 13 is disposed so that it can pivot in relation to the two first forming cylinders 11, 12. The figures show the state in which the forming cylinders 11, 12, 13 cooperate to form products from an extruded strand segment disposed between them. In order to place this extruded strand segment between the forming cylinders 11, 12, 13, the movable cylinder 13 can be pivoted away from the two other forming cylinders 11, 12. The three forming cylinders 11, 12, 13 have a common drive motor 15 for rotating them around their longitudinal axes. The drive shaft 16 of the drive motor 15 drives three gears 17 via a drive gear, which gears 17 are connected to articulating shafts 18, 19, 20. The articulating shafts 18, 19, 20 are interchangeably coupled to the respective forming cylinder 11, 12, 13 by means of coupling elements 21. The drive motor 15 is fastened to the frame of the unwinding machine 10 by means of a console 22. Furthermore, the console 22 is supported against a first partition wall 25 of the housing by means of a strut 23. The forming cylinders 11, 12, 13 are fastened at the ends to bearing blocks 26, 27. The bearing blocks 26, 27 each have a bearing body 28, 29 that supports the two rigid forming cylinders 11, 12 and is pivotably fastened to the forming cylinder 13 via a respective lever 31.

As can best be seen in FIG. 3, it is essential that the bearing blocks 26, 27 are partially contained in a form-fitting, positively engaging manner in correspondingly adapted recesses 32 of the partition walls 25, 25a. In order to fix the bearing blocks 26, 27 in the recesses 32 of the partition walls 25, 35a, a clamping device 25 is respectively provided, which preferably operates pneumatically, is connected in a stationary fashion to the frame of the unwinding machine 10, and acts with a rod 36 on an end face 37 of the bearing blocks 26, 27.

An additional drive motor 38 preferably embodied as a servomotor, which is disposed on the same side as the drive motor 15, is used to pivot the lever 31. The additional drive motor 38 is connected to another partition wall 40 of the housing of the unwinding machine 10 via a strut 39. On the end remote from the additional drive motor 38, its drive shaft 41 extends in a hollow shaft 42, which is supported in another partition wall 44 by means of an end piece 43. on the opposite sides of the partition walls 40, 44, a pivoting lever 45 is affixed in stationary fashion to drive shaft 41 or to the end piece 43 and respectively guides a roller 46, 47 coupled to the lever 31 via a track and when rotated, carries this roller along with it.

Finally, on the sides of the partition walls 40, 44 oriented toward each other, a signal disk 48 is respectively fastened to the drive shaft 41 and the end piece 43 and its position can be detected by a proximity sensor 49. The proximity sensors 49 are used to detect the zero point in a drive motor 38 embodied as a servomotor and consequently are used to control the pivoting motion of the forming cylinder 13.

The forming cylinders 11, 12, 13 are each suited for a particular format range. If the unrolling machine 10 is intended to process products with a different format range, then the forming cylinders 11, 12, 13 must be exchanged for a different set of forming cylinders. To this end, it is sufficient to release the clamp device 35 and to take the two bearing blocks 26, 27, together with the forming cylinders 11, 12, 13 attached to them, out of the recesses 32. Only the coupling elements 21, which connect the articulating shafts 18, 19, 20 to the forming cylinders 11, 12, 13, have to be previously detached. After other forming cylinders, which are supported on bearing blocks with identical external measurements, have been inserted into the recesses 32, the coupling elements 21 of the articulating shafts 18, 19, 20 have been connected to the new forming cylinders, the clamping device 35 has secured the new bearing blocks, and the control parameters have been changed through the use of a servomotor as a drive motor 38, the operation of the unwinding machine 10 can be restarted with a different format range.

The unwinding machine 10 according to the invention can be modified or altered in numerous ways. For example, it is conceivable to equip the unrolling machine 10 with a forming cylinder recognition device so that a particular provided movement program can be executed when the correspondingly encoded forming cylinders have been exchanged. Furthermore, the drive motor 38 for the pivoting motion of the forming cylinder 13 is preferably embodied as a tracking-controlled motor in order to optimize its movement.

The foregoing relates to preferred exemplary embodiments of the invention, it being understood that other variants and embodiments thereof are possible within the spirit and scope of the invention, the latter being defined by the appended claims.

What is claimed is:

1. An unwinding machine (10), having a number of forming cylinders (11, 12, 13) aligned parallel to one another for forming small-sized products from an extruded strand segment, a first drive motor (15) for rotating the forming cylinders (11, 12, 13) around their longitudinal axes and a second drive motor (38) for pivoting one of the forming cylinders (13) relative to the other forming cylinders (11, 12), characterized in that the forming cylinders (11, 12, 13) are fastened to bearing elements (26, 27), which can be fastened in an exchangeable fashion in recesses (32) of the unwinding machine (10) and in that the first drive motor (15) is coupled to the forming cylinders (11, 12, 13) by means of articulating elements (18, 19, 20).

2. The unwinding machine according to claim 1, wherein the bearing elements (26, 27) are block-shaped, the recesses (32) partially contain the bearing elements (26, 27) in a form-fitting, positively engaging manner, and the bearing elements (26, 27) can be fixed in the recesses (32) by means of at least one clamping device (35).

3. The unwinding machine according to claim 1, wherein the levers (31) pivotably support one of the forming cylinders (13); each of these levers (31) has a roller (46, 47), which respectively engages a pivoting lever (45) coupled to the second drive motor (38).

4. The unwinding machine according to claim 2, wherein the levers (31) pivotably support one of the forming cylinders (13); each of these levers (31) has a roller (46, 47), which respectively engages a pivoting lever (45) coupled to the second drive motor (38).

* * * * *